(12) United States Patent
Suyama et al.

(10) Patent No.: US 11,982,546 B2
(45) Date of Patent: May 14, 2024

(54) POSITION DETECTION DEVICE

(71) Applicant: Nippon Seiki Co., Ltd., Niigata (JP)

(72) Inventors: Yuki Suyama, Niigata (JP); Masataka Tanahashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 278 days.

(21) Appl. No.: 17/435,621

(22) PCT Filed: Mar. 3, 2020

(86) PCT No.: PCT/JP2020/008916
§ 371 (c)(1),
(2) Date: Sep. 1, 2021

(87) PCT Pub. No.: WO2020/184295
PCT Pub. Date: Sep. 17, 2020

(65) Prior Publication Data
US 2022/0155101 A1 May 19, 2022

(30) Foreign Application Priority Data

Mar. 11, 2019 (JP) ................................ 2019-043295

(51) Int. Cl.
*G01D 5/14* (2006.01)
*G01D 5/16* (2006.01)

(52) U.S. Cl.
CPC ............... *G01D 5/142* (2013.01); *G01D 5/16* (2013.01)

(58) Field of Classification Search
None
See application file for complete search history.

(56) References Cited

U.S. PATENT DOCUMENTS

| 4,184,384 A * | 1/1980 | Levine .................... F16H 51/00 74/579 E |
| 4,967,445 A | 11/1990 | Miller et al. |
| 11,698,274 B2 * | 7/2023 | Grasz ..................... G01D 5/145 324/207.2 |
| 2012/0056617 A1 * | 3/2012 | Hirose ................... G01D 5/145 315/80 |
| 2017/0276511 A1 | 9/2017 | Kotlaja et al. |

FOREIGN PATENT DOCUMENTS

| CN | 203606722 U | 5/2014 |
| JP | S63-052929 U1 | 4/1988 |
| JP | H07-255217 A | 10/1995 |

OTHER PUBLICATIONS

International Search Report issued in PCT/JP2020/008916, dated Apr. 14, 2021 w/English Translation.

* cited by examiner

*Primary Examiner* — Jas A Sanghera
(74) *Attorney, Agent, or Firm* — Rimon P.C.

(57) ABSTRACT

Provided is a position detecting device with which it is possible to suppress a concentration of stress. A position detecting device is provided with a lever member which rotates about a central axis of rotation O, a magnet unit, which is one example of a detected portion, that rotates about the central axis of rotation O as the lever member rotates and a magnetic detecting element, which is one example of a rotation detecting unit, that detects the rotation of the magnet unit. The lever member is provided with a thick plate portion, positioned in a location close to the central axis of rotation O, and a thin plate portion which is positioned farther from the central axis of rotation O than the thick plate portion, and which is formed thinner than the thick plate portion.

4 Claims, 11 Drawing Sheets

POSITION DETECTION DEVICE

CROSS REFERENCE TO RELATED APPLICATIONS

This application is the U.S. National Phase under 35 U.S.C. § 371 of International Application No. PCT/JP2020/008916, filed on Mar. 3, 2020, which claims the benefit of Japanese Application No. 2019-043295, filed on Mar. 11, 2019, the entire contents of each are hereby incorporated by reference.

TECHNICAL FIELD

The present invention relates to a position detection device.

BACKGROUND ART

For example, in the rotation sensor device described in Patent Literature 1, a magnet element rotates relative to a sensor element in association with rotation of a lever element. Accordingly, the rotation of the lever element is detected by the sensor element.

PRIOR ART DOCUMENT

Patent Document

Patent Literature 1: Specification of US Patent Application Publication No. 2017/0276511

SUMMARY OF THE INVENTION

Problems to be Solved by the Invention

In the configuration of Patent Literature 1 above, the lever element is formed in a flat plate shape extending from its central axis of rotation in a direction orthogonal to the central axis of rotation. Therefore, in a case where a force is applied in a direction along the central axis of rotation to the end portion of the lever element that is far from the central axis of rotation, the stress may be concentrated at the peripheral portion of the central axis of rotation in the lever element.

The present invention has been made in view of the above-described situation, and the object thereof is to provide a position detection device capable of suppressing stress concentration.

Solution to Problem

To achieve the above-described object, a position detection device according to the present invention includes: a lever member to rotate on a central axis of rotation; a detected portion to rotate on the central axis of rotation in association with rotation of the lever member; and a rotation detecting portion to detect rotation of the detected portion, wherein the lever member includes a thick plate portion, which is located at a section near the central axis of rotation, and a thin plate portion, which is located farther from the central axis of rotation than the thick plate portion and is formed to be thinner than the thick plate portion.

Effect of the Invention

According to the present invention, stress concentration can be suppressed in a position detection device.

MODE FOR CARRYING OUT THE INVENTION

First Embodiment

Hereinafter, the first embodiment of a position detection device according to the present invention will be explained with reference to the drawings.

Figure 1:
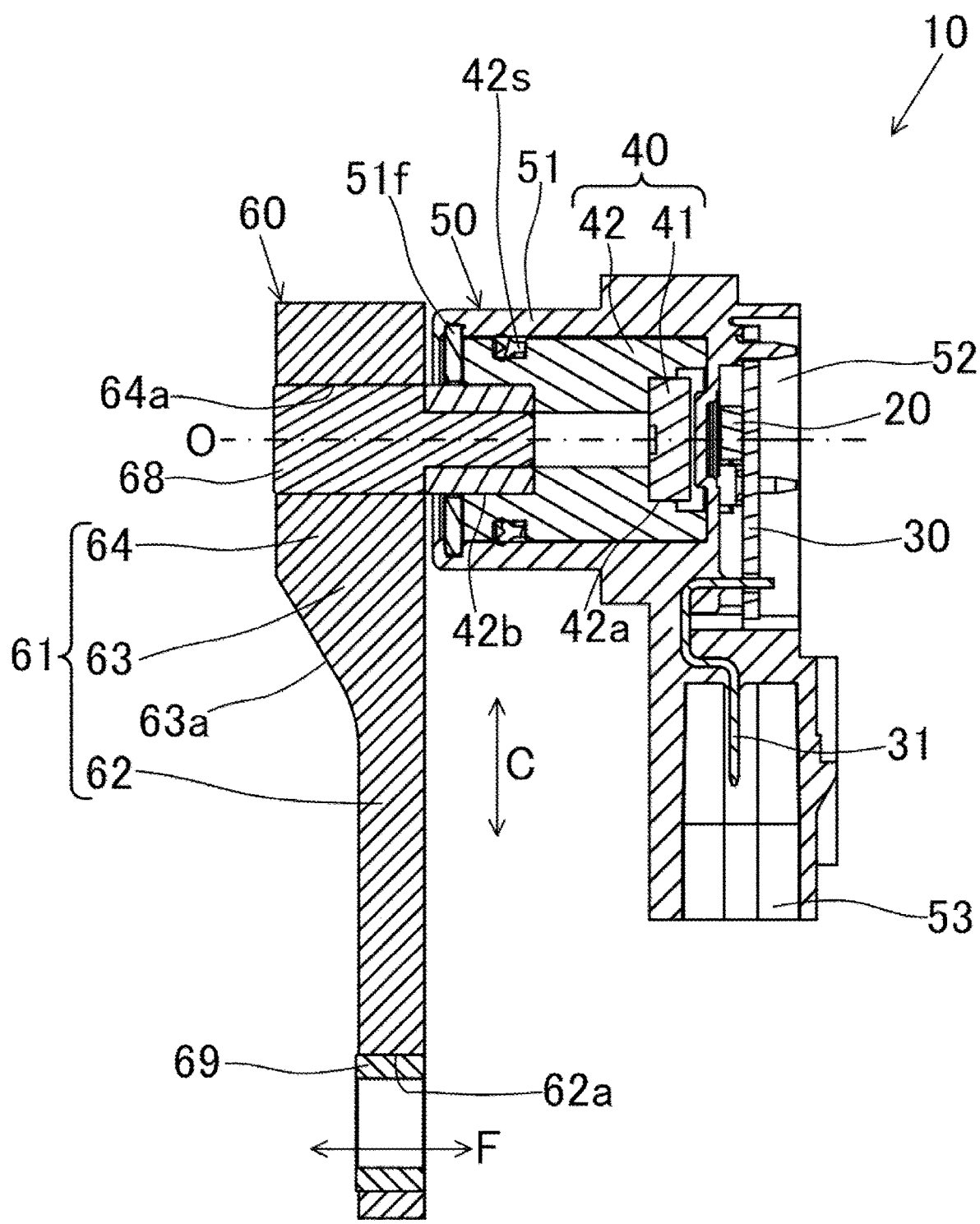
FIG. 1 A cross-sectional view of a position detection device according to the first embodiment of the present invention.

As illustrated in FIG. 1, the position detection device 10 includes the magnetic detecting element 20, the circuit substrate 30, the connector terminal 31, the magnet unit 40, the case 50, and the lever member 60.

The case 50 is formed of resin and is fixed to a vehicle body side, which is not illustrated in the drawings. The case 50 includes the magnet unit housing portion 51, which houses the magnet unit 40 so that the magnet unit 40 can rotate on the central axis of rotation O, the substrate housing portion 52, which houses the circuit substrate 30, and the connector portion 53, where the tip of the connector terminal 31 is located.

The magnet unit housing portion 51 has a bottomed hole extending along the central axis of rotation O of the lever member 60 and opening toward one side (the left side in FIG. 1) of the central axis of rotation O. The lid 51f in a flat plate ring shape is engaged in the opening of the magnet unit housing portion 51 in a state where the magnet unit 40 is located inside the magnet unit housing portion 51.

The substrate housing portion 52 has a rectangular hole aligned with respect to the magnet unit housing portion 51 along the central axis of rotation O and opening toward the other side (the right side in FIG. 1) of the central axis of rotation O.

The connector portion 53 has a rectangular cylindrical shape aligned with respect to the substrate housing portion 52 along the axial orthogonal direction C, which is orthogonal to the central axis of rotation O, and opening in the direction outward from the central axis of rotation O in the axial orthogonal direction C.

The circuit substrate 30 is fixed inside the substrate housing portion 52 in a direction along the axial orthogonal direction C. The magnetic detecting element 20 is configured with a Hall element, a magneto-resistive element, or the like covered with resin, and is installed on the surface of the circuit substrate 30 facing the later-described magnet 41. The magnetic detecting element 20 detects a change in the magnetic field in association with rotation of the magnet unit 40. The base of the connector terminal 31 is connected to the circuit substrate 30, and the tip of the connector terminal 31 is located inside the connector portion 53 of the case 50. With a cable, which is not illustrated in the drawings, being connected to the connector portion 53, a detection signal detected by the magnetic detecting element 20 is output to an extraneous part via the circuit substrate 30 and the connector terminal 31.

As illustrated in FIG. 1, the magnet unit 40 includes the magnet 41 and the bushing 42.

The magnet 41 is formed in a disk shape and provides a change in the magnetic field to the magnetic detecting element 20 in association with rotation of the magnet unit 40.

The bushing 42 is formed of resin and has a cylindrical shape extending along the central axis of rotation O. The bushing 42 is disposed so as to be rotatable on the central axis of rotation O inside the magnet unit housing portion 51 of the case 50. The bushing 42 includes the magnet holding portion 42a and the pin holding portion 42b. The magnet holding portion 42a is located at the end face of the bushing 42 facing the magnetic detecting element 20 and has a hole for holding the magnet 41. The pin holding portion 42b is located at the end face facing the lever member 60 and has a hole for holding the later-described pin 68 of the lever member 60. For example, the bushing 42 and the magnet 41 are formed as one piece by insert molding. The seal member 42s in a ring shape is engaged on the peripheral face of the bushing 42. The seal member 42s is in contact with the inner peripheral face of the magnet unit housing portion 51 so as to prevent water or the like from entering the magnet unit housing portion 51.

Figure 2:
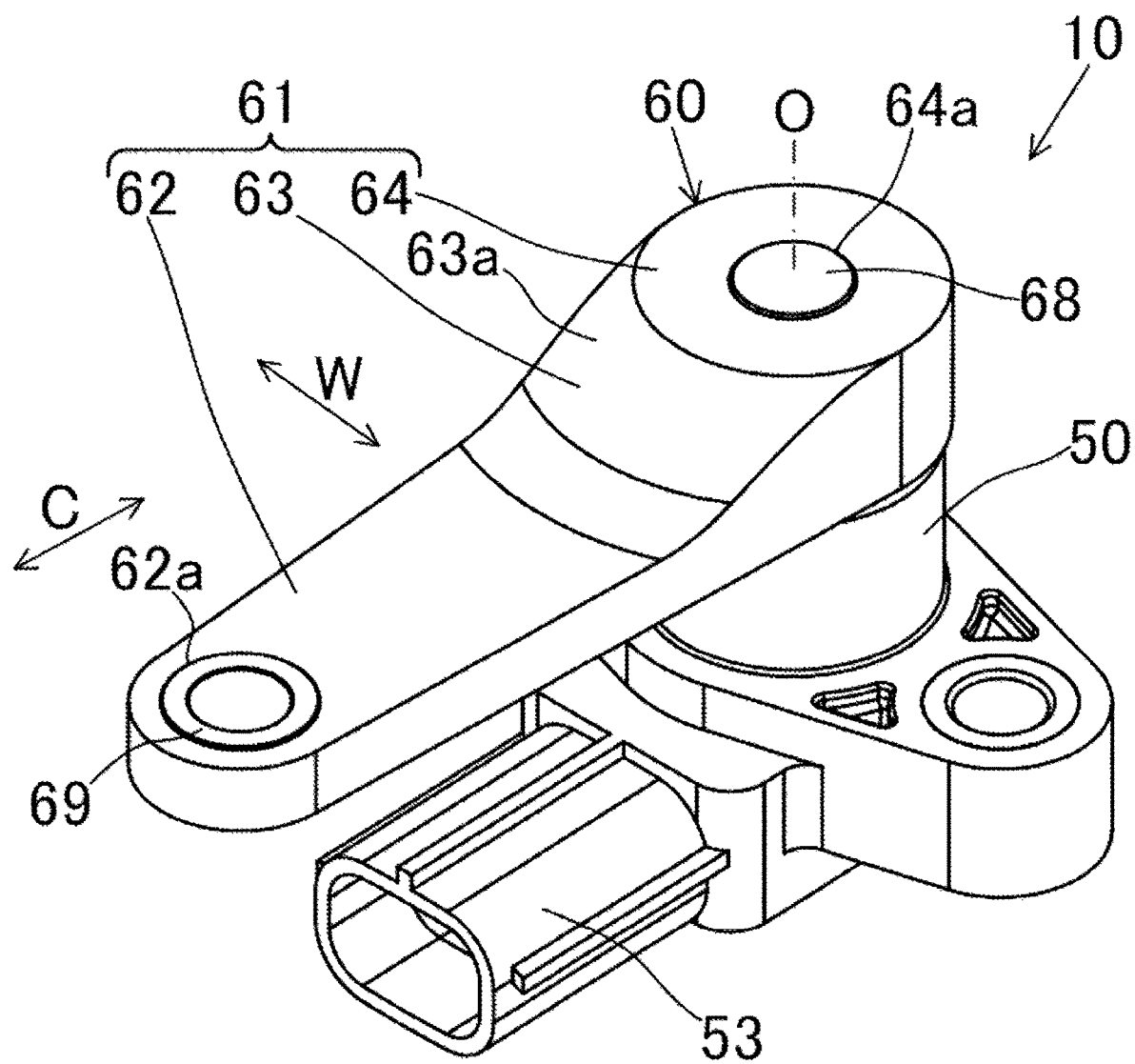
FIG. 2 A perspective view of the position detection device according to the first embodiment of the present invention.

As illustrated in FIG. 1 and FIG. 2, the lever member 60 is a member extending in the longitudinal direction along the axial orthogonal direction C from the central axis of rotation O and is rotated on the central axis of rotation O by a link member, which is not illustrated in the drawings. In detail, the lever member 60 includes the lever body portion 61, the pin 68, and the attached portion 69.

The lever body portion 61 is formed of resin. The lever body portion 61 includes the thin plate portion 62, the tapered portion 63, and the thick plate portion 64. In the order from nearest to the central axis of rotation O, the thick plate portion 64, the tapered portion 63 and the thin plate portion 62 are arranged along the axial orthogonal direction C. The respective back faces (the faces on the right side in FIG. 1) of the thick plate portion 64, the tapered portion 63, and the thin plate portion 62 are formed as the same plane.

As illustrated in FIG. 1 and FIG. 2, the thick plate portion 64 is formed in a cylindrical shape extending along the central axis of rotation O. The thickness of the thick plate portion 64 in the direction along the central axis of rotation O is formed to be thicker than the thickness of the thin plate portion 62 in the same direction. As an example, the thickness of the thick plate portion 64 is formed to be two to three times thicker than the thickness of the thin plate portion 62. The thick plate portion 64 has the pin holding hole 64a extending along the central axis of rotation O. The pin 68 is fixed inside the pin holding hole 64a. The pin 68 is formed in a cylindrical shape extending along the central axis of rotation O. For example, the lever body portion 61 and the pin 68 are formed as one piece by insert molding. The end portion of the pin 68 near the magnet unit 40 protrudes from the back face of the lever body portion 61. The end portion of the pin 68 is held inside the pin holding portion 42b. For example, the end portion of the pin 68 is press-fitted inside the pin holding portion 42b of the bushing 42. Accordingly, the lever member 60 and the magnet unit 40 are formed as one piece.

The tapered portion 63 is disposed between the thick plate portion 64 and the thin plate portion 62 in the axial orthogonal direction C (the longitudinal direction). The tapered portion 63 has the oblique face 63a that connects the front face of the thick plate portion 64 (the face on the left side in FIG. 1) and the front face of the thin plate portion 62 (the face on the left side in FIG. 1). The oblique face 63a is formed so that its height becomes lower from the thick plate portion 64 toward the thin plate portion 62.

Figure 4:
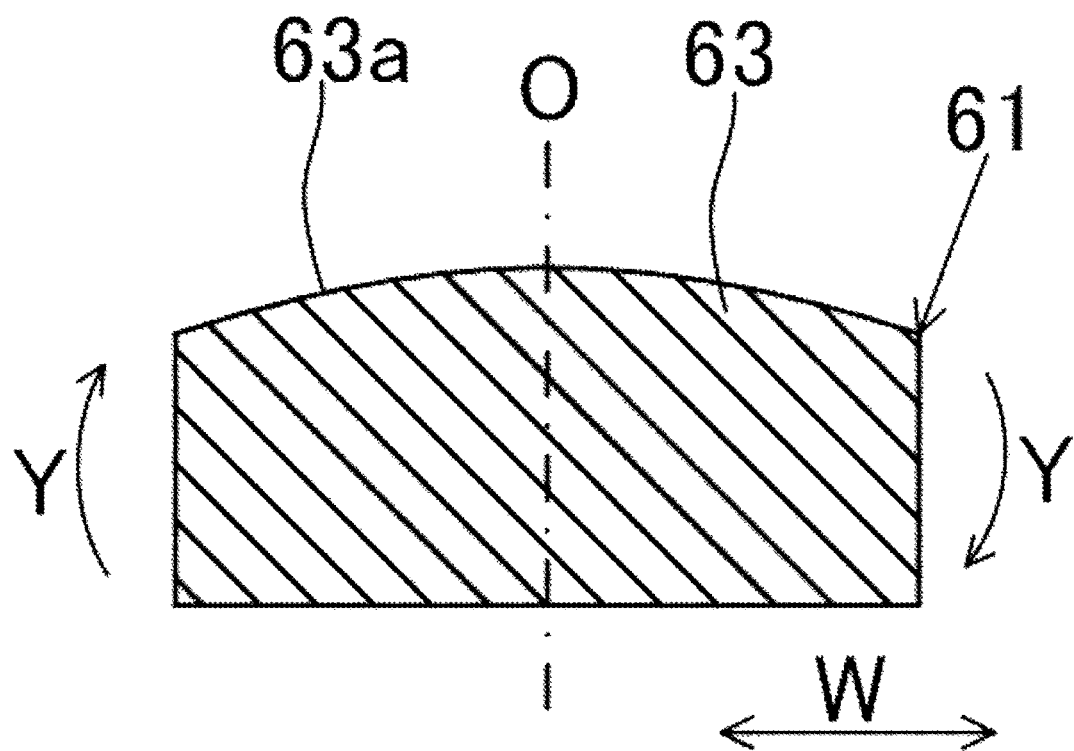
FIG. 4 A cross-sectional view of Line B-B of FIG. 3.

Further, as illustrated in FIG. 4, the oblique face 63a is formed so that its height becomes lower from the center toward the outer sides in the width direction W (the lateral direction) of the lever member 60. In other words, the oblique face 63a has a shape with an upwardly convex curved face in the width direction W. Accordingly, the thickness of the tapered portion 63 is thickest at the center of the width direction W, and the thickness becomes thinner from the center of the width direction W towards the outer sides.

Figure 3:
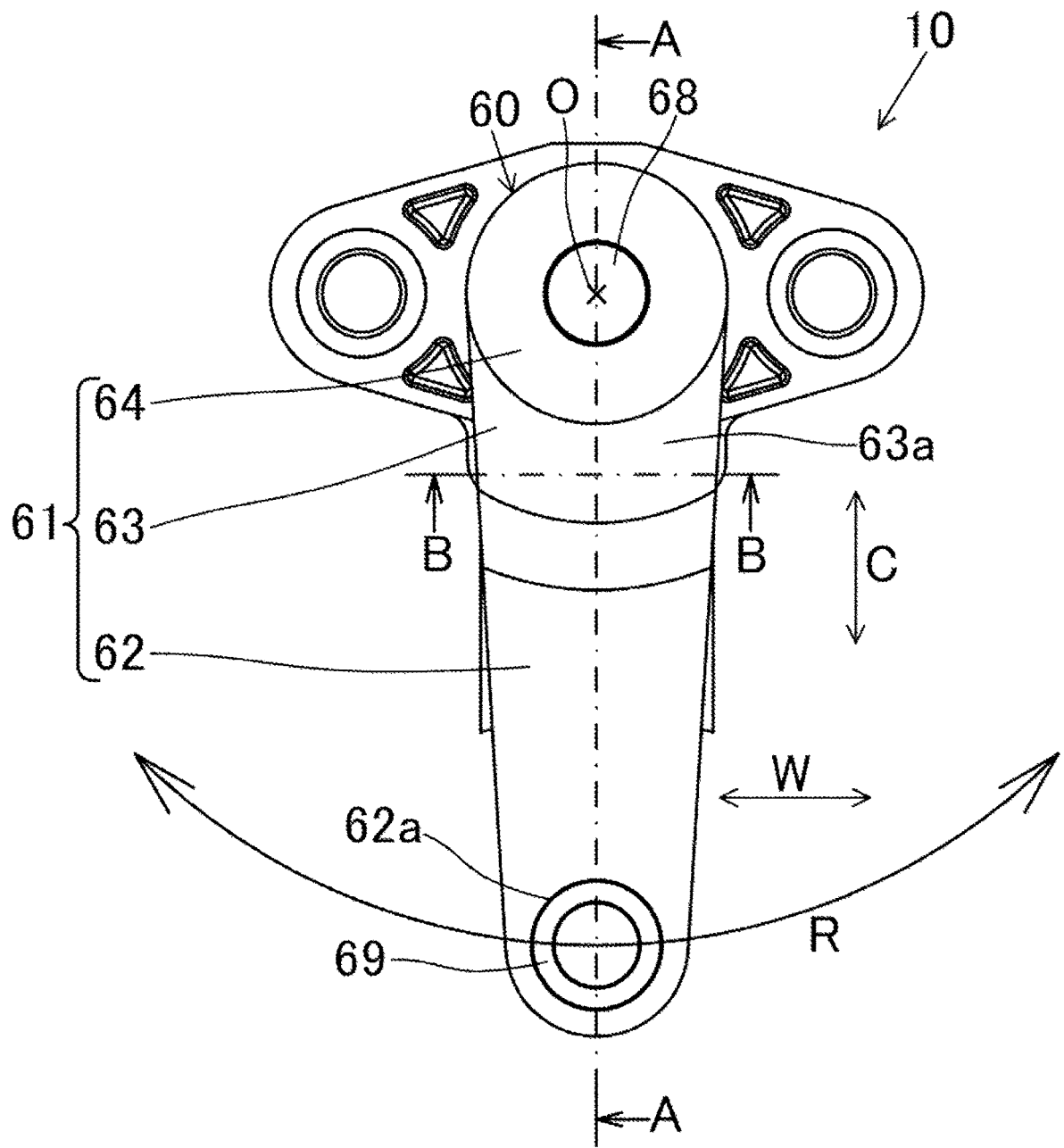
FIG. 3 A plan view of the position detection device according to the first embodiment of the present invention.

As illustrated in FIG. 2 and FIG. 3, the thin plate portion 62 is located on the outer side of the tapered portion 63 in the axial orthogonal direction C and has a flat plate shape elongated in the axial orthogonal direction C. In detail, the thickness direction of the thin plate portion 62 matches the direction along the central axis of rotation O, and the length in the width direction W of the thin plate portion 62 is formed so as to become narrower toward the tip of the thin plate portion 62. On the tip side of the thin plate portion 62, the through hole 62a which penetrates the thin plate portion 62 in the thickness direction so as to hold the attached portion 69. The attached portion 69 is formed of metal in a ring shape. The attached portion 69 is attached to the link member, which is not illustrated in the drawings.

Next, the action of the position detection device 10 will be explained.

The link member, which is not illustrated in the drawings, converts a linear motion into a rotational motion and transmits the converted rotational motion to the lever member 60. Accordingly, as illustrated in FIG. 3, the lever member 60 rotates on the central axis of rotation O in the rotation direction R. In this way, as illustrated in FIG. 1, the magnet unit 40 rotates on the central axis of rotation O together with the pin 68 of the lever member 60. Here, the magnetic detecting element 20 detects a change in the magnetic field in association with the rotation of the magnet unit 40 and outputs a detection signal indicating the detection result to an extraneous part via the connector terminal 31.

As illustrated in FIG. 1, if the force F along the central axis of rotation O is applied to the tip portion of the lever member 60, stress is generated in the thick plate portion 64 of the lever member 60. However, since the thick plate portion 64 is formed to be thicker than the thin plate portion 62, stress concentration is suppressed and deformation of the lever member 60 associated with the force F is suppressed.

Advantageous Effect

According to the first embodiment explained above, the following advantageous effects are achieved.

(1) The position detection device 10 includes the lever member 60, which rotates on the central axis of rotation O, the magnet unit 40, which is an example of a detected portion that rotates on the central axis of rotation O in association with rotation of the lever member 60, and the magnetic detecting element 20, which is an example of a rotation detecting portion that detects the rotation of the magnet unit 40. The lever member 60 includes the thick plate portion 64, which is located at a section near the central axis of rotation O, and the thin plate portion 62, which is formed to be thinner than the thick plate portion 64 and is located farther from the central axis of rotation O than the thick plate portion 64. According to this configuration, even in a case where the force F is applied to the tip portion of the lever member 60, stress concentration is suppressed and deformation of the lever member 60 is suppressed as well since the thick plate portion 64 is formed to be thicker than the thin plate portion 62.

(2) The lever member 60 includes the tapered portion 63, which is located between the thick plate portion 64 and the thin plate portion 62 to connect the thick plate portion 64 and the thin plate portion 62.

According to this configuration, no step is formed between the thick plate portion 64 and the thin plate portion 62 because of the tapered portion 63. Since stress generally tends to be concentrated around a step, stress concentration is suppressed and deformation of the lever member 60 is suppressed as well by the tapered portion 63, which eliminates steps.

(3) The tapered portion 63 includes the oblique face 63a, which connects the front face of the thick plate portion 64 and the front face of the thin plate portion 62. The oblique face 63a is formed in a shape with a curved face so that its height becomes lower from the center toward the outer sides in the lateral direction of the lever member 60.

According to this configuration, the thickness of the tapered portion 63 is thickest at the center of the width direction W, and the thickness becomes thinner from the center of the width direction W towards the outer sides. Therefore, twisting of the lever member 60 is prevented since the stress is concentrated at the center of the tapered portion 63.

Further, the outer sides of the tapered portion 63 in the width direction W can be made thin. Accordingly, the lever member 60, and thus the position detection device 10, can be made lighter.

Furthermore, since the oblique face 63a is formed in the shape with a curved face, removal from the mold to form the lever member 60 is made easier.

Second Embodiment

Hereinafter, the second embodiment of a position detection device according to the present invention will be explained with reference to the drawings. In the following, the differences from the first embodiment will be mainly explained.

Figure 5:
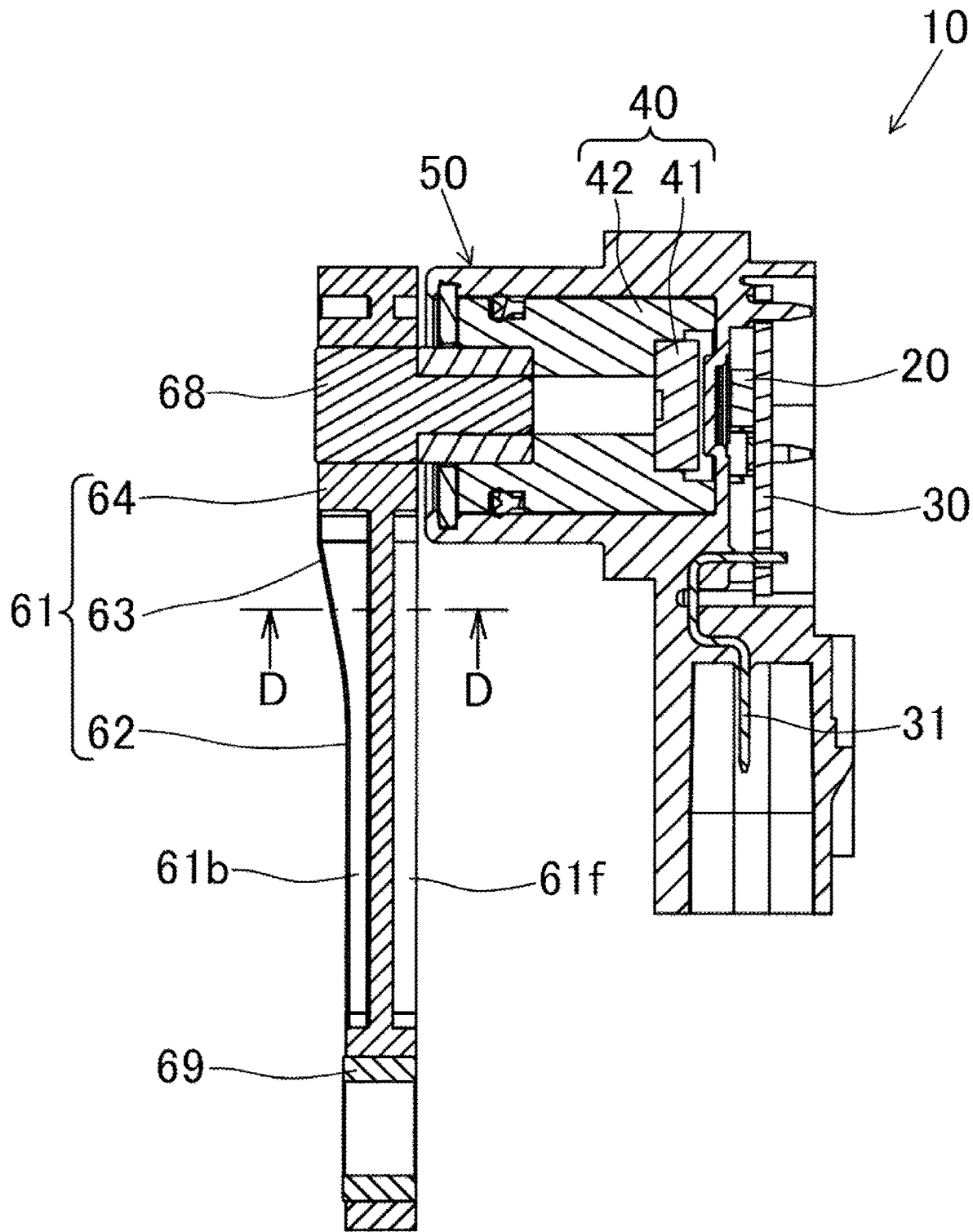
FIG. 5 A cross-sectional view of a position detection device according to the second embodiment of the present invention.
Figure 6:
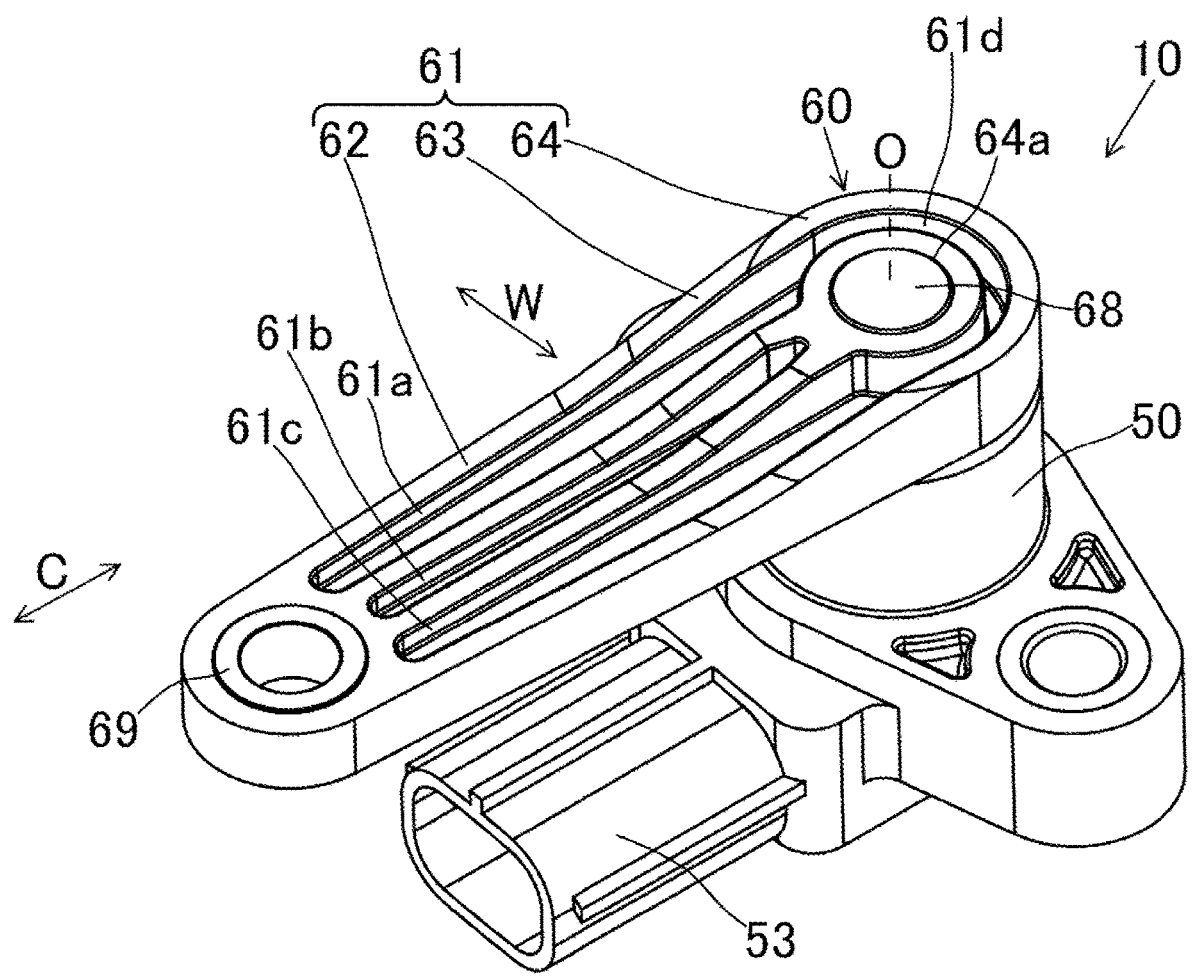
FIG. 6 A perspective view of the position detection device according to the second embodiment of the present invention.

As illustrated in FIG. 6, the groove portions 61a, 61b, 61c, and 61d are formed on the front face of the lever member 60. The groove portions 61a, 61b, and 61c extend along the axial orthogonal direction C (the longitudinal direction) and are aligned in the width direction W. The groove portions 61a, 61b, and 61c are formed in an area covering the thin plate portion 62, the tapered portion 63, and the thick plate portion 64. The bottom faces of the groove portions 61a, 61b, 61c, and 61d are located on the same plane. The groove portions 61a, 61b, 61c, and 61d are set to have depths proportional to the thickness of the lever member 60. For example, as illustrated in FIG. 5, the groove portion 61b in the thick plate portion 64 is set to be deeper than the groove portion 61b in the thin plate portion 62.

Figure 7:
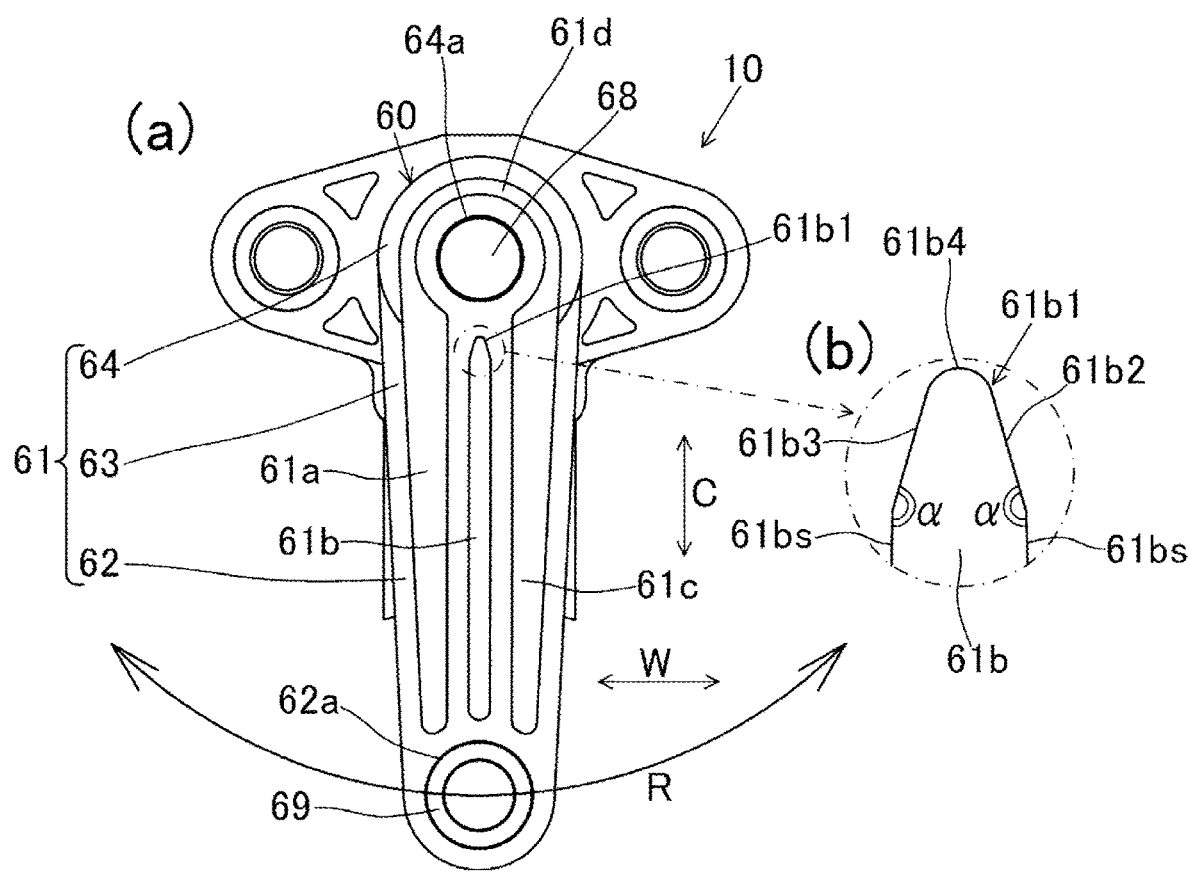
FIG. 7 (a) according to the second embodiment of the present invention is a plan view of the position detection device, and (b) is a partially-enlarged view of (a).

As illustrated in FIG. 7(a), the groove portions 61a and 61c are respectively located at both outer sides of the width direction W on the front face of the lever member 60. The groove portion 61b is located at the center of the width direction W on the front face of the lever member 60 between the groove portions 61a and 61c. The widths of the groove portions 61a and 61c are set to be narrower than the width of the groove portion 61b.

The outer end portions of the groove portions 61a, 61b, and 61c in the axial orthogonal direction C have semicircular arc shapes.

As enlarged and illustrated in FIG. 7(b), the tip portion 61b1 near the pin 68 in the groove portion 61b has an isosceles triangular shape with a rounded tip. The tip portion 61b1 includes the oblique faces 61b2 and 61b3, whose distance to each other becomes narrower toward the tip side of the groove portion 61b, and the semicircular arc face 61b4, which connects the tip portions of the oblique faces 61b2 and 61b3. The angle α formed by the side wall faces 61bs and the oblique faces 61b2 and 61b3 of the groove portion 61b is set to an obtuse angle. For example, the angle α is set to 150° to 170°. In this way, since no acute-angled portion is formed in the tip portion 61b1, stress concentration is suppressed.

As illustrated in FIG. 7(a), the groove portion 61d has a semicircular arc shape along the periphery of the pin 68 so as to connect the end portions of the groove portions 61a and 61c near the pin 68. The groove portions 61a, 61c, and 61d form a continuous groove extending in a U shape that encompasses the pin 68.

Figure 8:
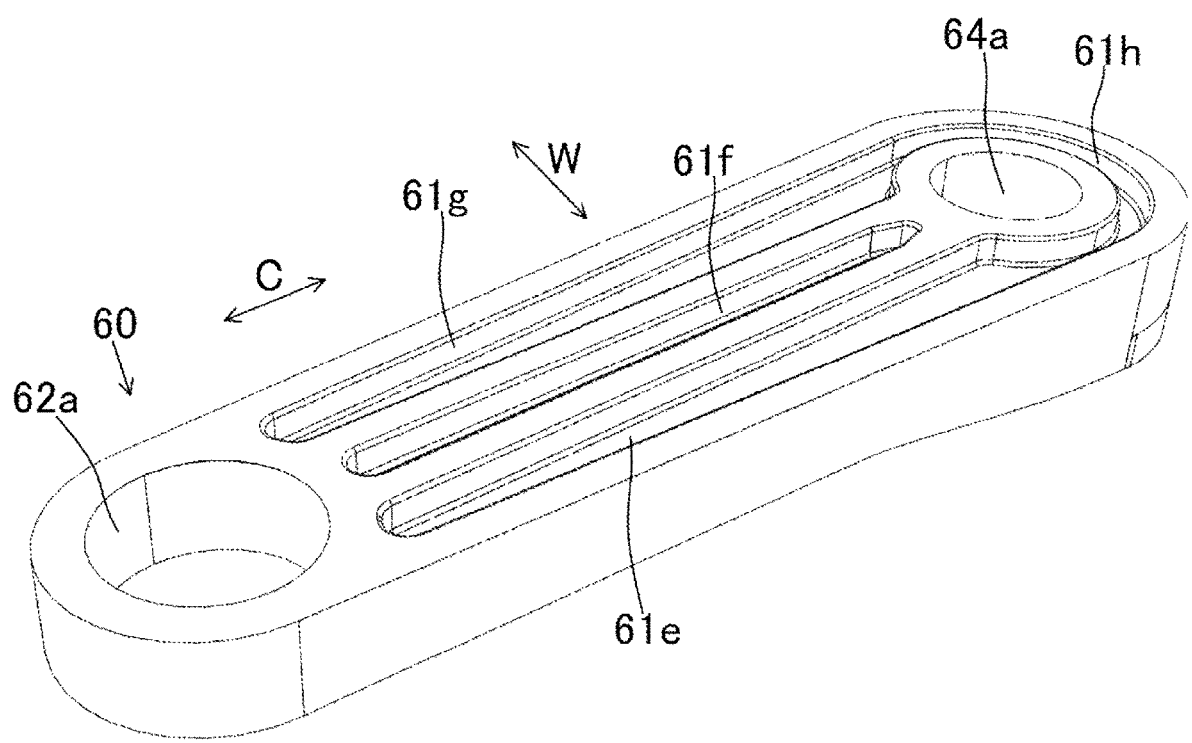
FIG. 8 A perspective view of a lever member viewed from the back side according to the second embodiment of the present invention.
Figure 9:
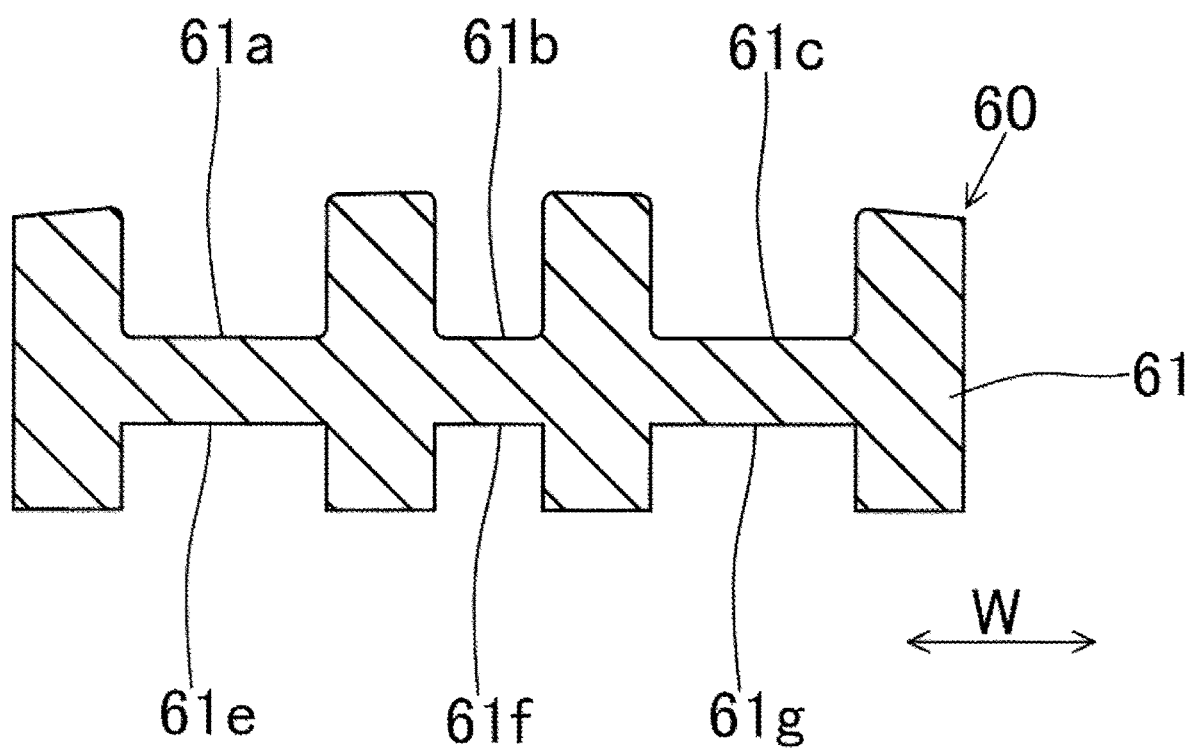
FIG. 9 A cross-sectional view of Line D-D of FIG. 5.

As illustrated in FIG. 8, the groove portions 61e, 61f, 61g, and 61h are formed on the back face of the lever member 60. The groove portions 61e, 61f, 61g, and 61h are similar in shape to the groove portions 61a, 61b, 61c, and 61d on the front face of the lever member 60, except that their depths are the same. As illustrated in FIG. 9, in the thickness direction of the lever member 60, the groove portion 61c and the groove portion 61g are opposite, the groove portion 61b and the groove portion 61f are opposite, and the groove portion 61a and the groove portion 61e are opposite.

The groove portions 61a to 61h are disposed to reduce the weight of the lever member 60 while maintaining the strength of the lever member 60.

Note that the groove portions 61b and 61f are examples of the first groove portion, the groove portions 61a, 61c, 61e, and 61g are examples of the second groove portions, and the groove portions 61d and 61h are examples of the third groove portion.

Advantageous Effect

According to the second embodiment explained above, the following advantageous effects are achieved.

(1) The lever member 60 includes the groove portions 61b and 61f, which are located on the front face and the back face of the lever member 60 and extend along the longitudinal direction (the axial orthogonal direction C) of the lever member 60. The tip portion 61b1 of the groove portions 61b and 61f facing the central axis of rotation O includes the pair of oblique faces 61b2 and 61b3, which are oblique so that the distance to each other becomes narrower toward the tip sides of the groove portions 61b and 61f and which form an obtuse angle α with the side wall faces 61bs of the groove portions 61b and 61f, and the arc face 61b4, which has an arc shape connecting the tip sides of the pair of oblique faces 61b2 and 61b3.

According to this configuration, since no acute-angled portion is formed in the tip portion 61b1, stress concentration is suppressed. Accordingly, deformation of the lever member 60 is suppressed and damage to the lever member 60 is suppressed. In particular, in a case where a force is applied to the tip of the lever member 60, the stress tends to be concentrated around the central axis of rotation O of the lever member 60. Therefore, it is beneficial to suppress stress concentration at the tip portion 61b1 of the groove portions 61b and 61f facing the central axis of rotation O.

(2) The lever member 60 includes the lever body portion 61, which has the pin holding hole 64a extending along the central axis of rotation O, and the pin 68, to which the magnet unit 40 is attached in a state where the pin 68 is fixed inside the pin holding hole 64a of the lever body portion 61. The lever body portion 61 includes the groove portions 61b and 61f, which are examples of the first groove portion, the groove portions 61a, 61c, 61e, and 61g, which are examples of the second groove portions that are located on both sides of the lever member 60 in the lateral direction (the width direction W) with respect to the groove portions 61b and 61f and extend along the longitudinal direction (the axial orthogonal direction C), and the groove portions 61d and 61h, which are examples of the third groove portion that extends in an arc shape connecting a pair of end portions of the groove portions 61a, 61c, 61e, and 61g near the central axis of rotation O through the periphery of the pin 68.

According to this configuration, the groove portions 61a, 61c, and 61d and the groove portions 61e, 61g, and 61h form grooves in a continuous U-shape, respectively. Thus, the weight of the lever member 60 can be reduced more since the distance of the grooves can be long.

Further, the groove portions 61d and 61h are located at the base side of the lever member 60. Even in a case where the force F is applied to the tip side of the lever member 60, the stress does not tend to be concentrated on the base side. Therefore, even with the groove portions 61d and 61h, reduction in the strength of the lever member 60 is suppressed.

Note that the present invention is not limited to the above embodiments and drawings. It is possible to add modifications (including deletion of constituent elements) as appropriate in such a range that the gist of the present invention is not changed. An example of modifications will be explained below.

MODIFICATION EXAMPLE

Figure 10:
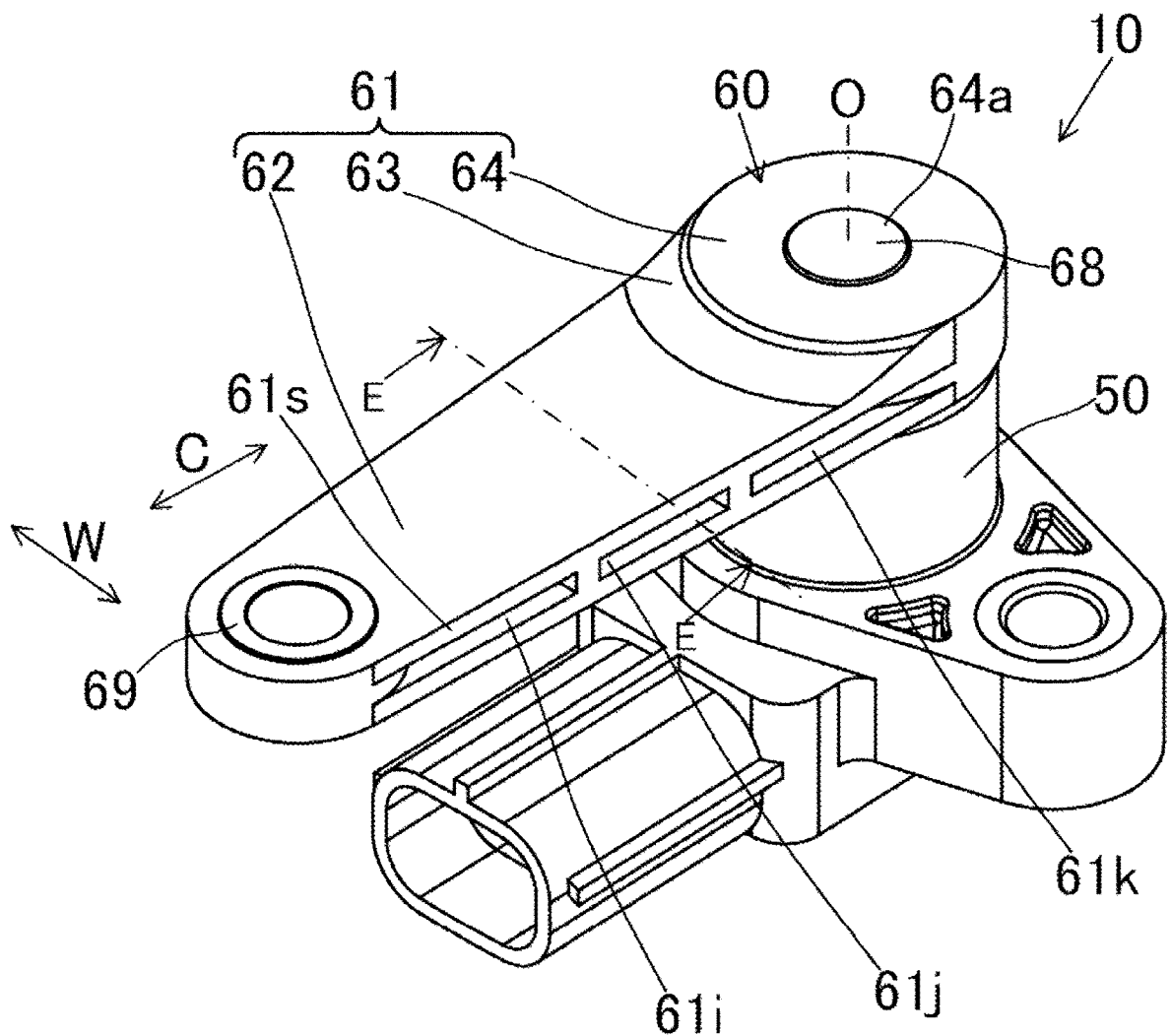
FIG. 10 A perspective view of a position detection device according to a modification example of the present invention.
Figure 11:
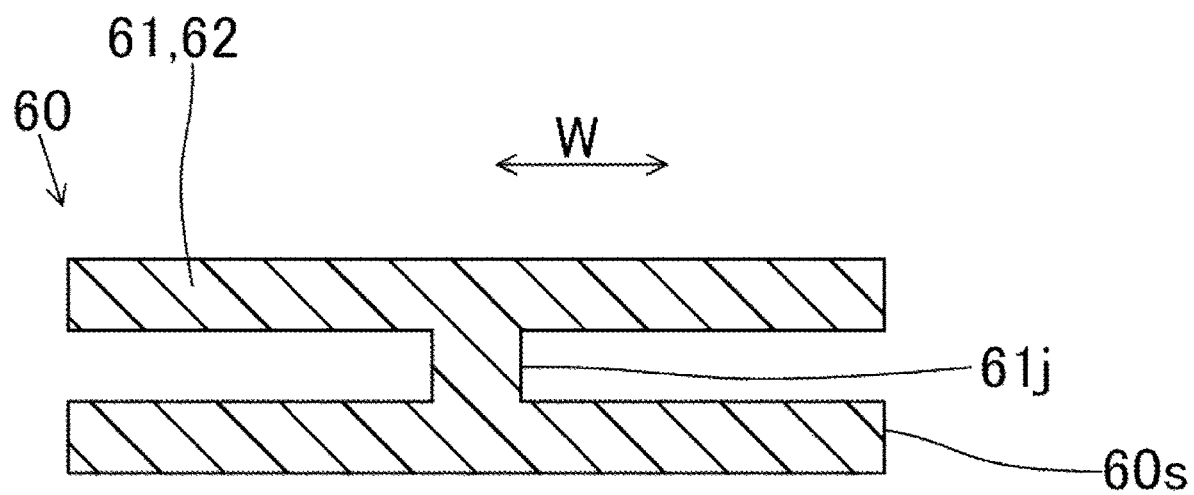
FIG. 11 A cross-sectional view of Line E-E of FIG. 10.

The positions of the groove portions of the lever member 60 in the above-described second embodiment can be changed as appropriate. For example, as illustrated in FIG. 10, the groove portions 61i, 61j, and 61k are formed on the side face 61s of the lever member 60. The groove portions 61i, 61j, and 61k are aligned along the axial orthogonal direction C (the longitudinal direction) and are formed as bottomed holes that open outwardly in the rotation direction R. Further, three groove portions similar to the groove portions 61i, 61j, and 61k are formed also on the side face on the opposite side of the side face 61s of the lever member 60. In this case, as illustrated in FIG. 11, the lever member 60 has an H-shaped cross section.

Although the position detection device 10 is a magnetic type in each of the above-described embodiments, an optical type, a capacitance type, a contact type, etc., are also possible other than the magnetic type.

Although the tapered portion 63 is disposed between the thin plate portion 62 and the thick plate portion 64 in each of the above-described embodiments, the tapered portion 63 may be omitted. Further, it is also possible that the thin plate portion 62 and the thick plate portion 64 are omitted and the tapered portion 63 is formed from the base to the tip of the lever member 60.

Although the groove portions 61a to 61h are formed on the front face and the back face of the lever member 60 in each of the above-described embodiments, the groove portions 61a, 61b, 61c, and 61d on the front face of the lever member 60 may be omitted, and the groove portions 61e, 61f, 61g, and 61h on the back face of the lever member 60 may be omitted. Any one or more of the groove portions 61a to 61h may be omitted as appropriate.

Although the position detection device 10 includes the connector terminal 31 in each of the above-described embodiments, there is not a limitation as such, and it is also possible that a cable connected to the circuit substrate 30 is included.

It is also possible that, in the above-described second embodiment, all of the end portions of the groove portions have a shape similar to the tip portion 61b1 of the groove portions 61b and 61f. Conversely, it is also possible that the tip portion 61b1 of the groove portions 61b and 61f has a shape similar to the end portions of the other groove portions.

DESCRIPTION OF REFERENCE NUMERALS 10 position detection device
20 magnetic detecting element
30 circuit substrate
31 connector terminal
40 magnet unit
41 magnet
42 bushing
42a magnet holding portion
42b pin holding portion
50 case
60 lever member
61 lever body portion
61a to 61k groove portion
61b1 tip portion
61b2, 61b3 oblique face
61b4 arc face
61bs side wall face
62 thin plate portion
63 tapered portion
63a oblique face
64 thick plate portion
64a pin holding hole
68 pin
69 attached portion
α angle
C axial orthogonal direction
O central axis of rotation
R rotation direction W width direction

The invention claimed is:

1. A position detection device comprising:
a lever member to rotate on a central axis of rotation;
a detected portion to rotate on the central axis of rotation in association with rotation of the lever member; and
a rotation detecting portion to detect rotation of the detected portion,
wherein the lever member includes a thick plate portion, which is located at a section near the central axis of rotation, and a thin plate portion, which is located farther from the central axis of rotation than the thick plate portion and is formed to be thinner than the thick plate portion,
wherein the lever member includes a groove portion, which is located at least either a front face or a back face of the lever member and extends along a longitudinal direction of the lever member, and
wherein a tip portion of the groove portion facing the central axis of rotation includes a pair of oblique faces, which are oblique so that a distance to each other becomes narrower toward a tip side of the groove portion and form an obtuse angle with side faces of the groove portion, and an arc face in an arc shape connecting tip sides of the pair of oblique faces.

2. The position detection device according to claim 1,
wherein the lever member includes a tapered portion, which is located between the thick plate portion and the thin plate portion to connect the thick plate portion and the thin plate portion.

3. The position detection device according to claim 2,
wherein the tapered portion includes an oblique face, which connects a front face of the thick plate portion and a front face of the thin plate portion, and
wherein the oblique face is formed so that a height thereof becomes lower from a center to an outer side in a lateral direction of the lever member.

4. The position detection device according to claim 1,
wherein the lever member includes a lever body portion, which has a pin holding hole extending along the central axis of rotation, and a pin, to which the detected portion is attached in a state where the pin is fixed inside the pin holding hole of the lever body portion, and
wherein the lever body portion includes a first groove portion, which is the groove portion, second groove portions, which are located on both sides of the first groove portion in a lateral direction of the lever member and extend along the longitudinal direction, and a third groove portion, which extends in an arc shape connecting end portions of the second groove portions near the central axis of rotation to each other through a periphery of the pin.

* * * * *